United States Patent
Baran et al.

(10) Patent No.: US 9,153,354 B2
(45) Date of Patent: Oct. 6, 2015

(54) COMPOSITIONS COMPRISING CONDUCTIVE PARTICLES WITH SURFACE-MODIFIED NANOPARTICLES COVALENTLY ATTACHED THERETO, AND METHODS OF MAKING

(75) Inventors: Jimmie R. Baran, Prescott, WI (US); Jeanne M. Bruss, Cottage Grove, MN (US); Jeffrey W. McCutcheon, Baldwin, WI (US); Haeen Sykora, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 496 days.

(21) Appl. No.: 13/504,651

(22) PCT Filed: Nov. 19, 2010

(86) PCT No.: PCT/US2010/057399
§ 371 (c)(1),
(2), (4) Date: Apr. 27, 2012

(87) PCT Pub. No.: WO2011/063217
PCT Pub. Date: May 26, 2011

(65) Prior Publication Data
US 2012/0313056 A1  Dec. 13, 2012

Related U.S. Application Data

(60) Provisional application No. 61/262,934, filed on Nov. 20, 2009.

(51) Int. Cl.
| | | |
|---|---|---|
| H01B 1/12 | (2006.01) | |
| H01B 1/20 | (2006.01) | |
| H01B 1/22 | (2006.01) | |
| H01B 1/16 | (2006.01) | |
| B82Y 30/00 | (2011.01) | |
| C08K 3/36 | (2006.01) | |
| C08L 33/08 | (2006.01) | |
| C09J 9/02 | (2006.01) | |
| C09J 11/04 | (2006.01) | |
| C08K 9/02 | (2006.01) | |
| C08K 9/06 | (2006.01) | |

(52) U.S. Cl.
CPC . *H01B 1/22* (2013.01); *B82Y 30/00* (2013.01); *C08K 3/36* (2013.01); *C08L 33/08* (2013.01); *C09J 9/02* (2013.01); *C09J 11/04* (2013.01); *H01B 1/16* (2013.01); *H01B 1/20* (2013.01); *C08K 9/02* (2013.01); *C08K 9/06* (2013.01); *C08K 2201/001* (2013.01)

(58) Field of Classification Search
CPC .............. H01B 1/22; H01B 1/20; H01B 1/00; H01B 1/16; B82Y 30/00; B82Y 40/00; C03C 17/00; C03C 2217/452
USPC .......................................... 252/519.21, 519.2
See application file for complete search history.

(56) References Cited

U.S. PATENT DOCUMENTS

| | | | | |
|---|---|---|---|---|
| 3,992,160 | A * | 11/1976 | Marzocchi et al. | 75/229 |
| 6,586,483 | B2 | 7/2003 | Kolb | |
| 2002/0128336 | A1 | 9/2002 | Kolb | |
| 2007/0213449 | A1 | 9/2007 | Lewandowski | |
| 2007/0281161 | A1 | 12/2007 | Ishida | |
| 2008/0085410 | A1 * | 4/2008 | Simone et al. | 428/355 CP |
| 2008/0286362 | A1 | 11/2008 | Baran | |
| 2009/0071368 | A1 * | 3/2009 | Steingrover et al. | 106/35 |
| 2009/0232867 | A1 | 9/2009 | Domb | |
| 2009/0294046 | A1 | 12/2009 | Sim | |

FOREIGN PATENT DOCUMENTS

| | | |
|---|---|---|
| CN | 1962060 A | 5/2007 |
| CN | 101058418 A | 10/2007 |
| CN | 101508418 A | 8/2009 |
| JP | 2003-26813 | 1/2003 |
| JP | 2004-189938 | 7/2004 |
| JP | 2005-203319 | 7/2005 |
| JP | 2006-059721 | 3/2006 |
| JP | 2009-529089 | 8/2009 |
| KR | 10-2007-0046043 | 5/2007 |
| WO | WO 2004/045027 | 5/2004 |
| WO | WO 2007-102975 | 9/2007 |
| WO | WO 2008/014169 | 1/2008 |
| WO | WO 2010/077583 | 7/2010 |
| WO | WO 2010/077773 | 7/2010 |
| WO | WO 2010/151435 | 12/2010 |

OTHER PUBLICATIONS

Global Spec: The Engineering Search Engine. "About Pressure Sensitive Adhesives and Contact Adhesives" (website document dated Mar. 19, 2005; accessed from The Wayback Machine on Nov. 15, 2014, attached to the case file as a PDF).*

International Search Report, PCT/US2010/057399, mailed Aug. 2, 2011, 3 pages.

Extended European Search Report, EP10832249.6-1308/2502239 (PCT/US2010US057399), dated Jan. 7, 2015, 3 pages.

* cited by examiner

*Primary Examiner* — Harold Pyon
*Assistant Examiner* — Katie L Hammer
(74) *Attorney, Agent, or Firm* — Kenneth B. Wood

(57) ABSTRACT

Compositions are disclosed comprising a plurality of conductive particles wherein each conductive particle comprises a plurality of surface-modified nanoparticles that are covalently bonded to the surface of the conductive particle. Compositions are also disclosed wherein the plurality of conductive particles comprising a plurality of surface-modified nanoparticles covalently bonded thereto, are provided in an organic vehicle.

20 Claims, No Drawings

COMPOSITIONS COMPRISING CONDUCTIVE PARTICLES WITH SURFACE-MODIFIED NANOPARTICLES COVALENTLY ATTACHED THERETO, AND METHODS OF MAKING

CROSS REFERENCE TO RELATED APPLICATIONS

This application is a national stage filing under 35 U.S.C. 371 of PCT/US2010/057399, filed Nov. 19, 2010, which claims priority to U.S. Provisional Application No.61/262934, filed Nov. 20, 2009, the disclosure of which is incorporated by reference in its/their entirety herein.

BACKGROUND

It is common practice in industry to use conductive particles, e.g., in conductive adhesives, dielectric layers, and the like.

SUMMARY

Compositions are disclosed comprising a plurality of conductive particles wherein each conductive particle comprises a plurality of surface-modified nanoparticles that are covalently bonded to the surface of the conductive particle. Compositions are also disclosed wherein the plurality of conductive particles comprising a plurality of surface-modified nanoparticles covalently bonded thereto, are provided in an organic vehicle.

In one aspect, disclosed herein is a composition comprising a plurality of conductive particles; wherein each conductive particle comprises a plurality of surface-modified nanoparticles that are covalently bonded to the surface of the conductive particle.

In another aspect, disclosed herein is a composition comprising an organic vehicle comprising a plurality of conductive particles; wherein each conductive particle comprises a plurality of surface-modified nanoparticles that are covalently bonded to the surface of the conductive particle.

In another aspect, disclosed herein is a method of making a composition comprising a plurality of conductive particles with surface-modified nanoparticles covalently bonded thereto, comprising: providing a plurality of nanoparticles in a liquid; reacting at least some of the nanoparticles with multifunctional surface-modifying agent molecules so that at least a portion of the surface of each nanoparticle comprises multifunctional surface-modifying agent molecules covalently bonded to the nanoparticle; adding a plurality of conductive particles to the liquid; and, reacting at least some of the conductive particles with at least some of the multifunctional surface-modifying agent molecules that are covalently bonded to the surface of the nanoparticles, so that each conductive particle thus reacted comprises a plurality of surface-modified nanoparticles attached thereto by way of the multifunctional surface-modifying agent.

DETAILED DESCRIPTION

Described herein are compositions comprising a plurality of conductive particles wherein each conductive particle comprises a plurality of surface-modified nanoparticles that are covalently bonded to the surface of the conductive particle. As used herein, the term conductive particle denotes any particle that comprises at least a layer (e.g., a surface coating) of a material recognized as having an intrinsic electrical conductivity of at least about $1 \times 10^7$ siemens per meter (S/m). As such, the term conductive particle encompasses particles that are comprised substantially or entirely of conductive materials (e.g., metal particles) as well as particles comprised of a relatively nonconductive core (e.g., of a polymeric material, of glass, etc.) that is coated (e.g., surface coated) with a conductive coating.

Thus while solid metal conductive particles may be used, such particles may have a density higher than optimal, e.g. that may cause them to, under the influence of gravity, settle through an organic vehicle (e.g., a syrup from which a pressure-sensitive adhesive may be derived) in which the particles are suspended, to an undesired extent. In some embodiments, the electrically conductive particles disclosed herein may thus comprise a relatively low density core material coated with an electrically conductive material. More particularly, polymeric flakes, glass or ceramic shards, and the like may suffice as core particles. Electrically conductive metals, mixtures and alloys thereof, and the like, can be used on the surface of the particles, providing low electrical resistance. The use of low density materials with conductive coatings, e.g. conductive metal coatings, thereupon, may advantageously allow the particles to more easily remain suspended e.g. within an organic vehicle e.g. at least until a stable pressure sensitive adhesive coated layer can be formed therefrom.

In various embodiments, the electrically conductive particles may be low density electrically conductive fillers, such as carbon flakes or fibers, or fillers of low density material such as polyethylene, polystyrene, phenol resin, epoxy resin, or acryl resin, or glass shards, silica, graphite, or ceramic, prepared with a surface covering or coating of a metal such as silver, copper, nickel, gold, tin, zinc, platinum, palladium, iron, tungsten, molybdenum, alloys thereof, solder, or the like. The conductive coating may be generally continuous and may comprise e.g. from about 5 to about 45 weight percent (wt. %) of the total weight of the coating plus the base particle.

Such conductive particles may comprise any desired shape, e.g. shards, wedges, trapezoids, and the like. Some such particles may have a width and/or depth much greater than the thickness, which may be represented by the aspect ratio of the particle (defined herein as the ratio of the longest dimension of the particle to the smallest dimension of the particle). In various embodiments, the conductive particles may have an aspect ratio of at least about 2:1, at least about 4:1, or at least about 7:1. In some embodiments the particles may be fibers, which may comprise generally similar width and depth, which dimensions typically are much less than the length. In some embodiments the particles may be spherical, e.g. with generally similar length, width, and depth dimensions.

Low aspect ratio particles such as spherical particles may advantageously provide enhanced z-axis conductivity through the thickness of a layer (e.g. an adhesive layer) containing the conductive particles. High aspect ratio particles such as flakes and/or fibers may advantageously provide enhanced x-y electrical conductivity in the plane of a layer (e.g., an adhesive layer) containing the conductive particles (those of skill in the art will appreciate that an improvement in x-y conductivity by the use of e.g. high aspect ratio particles may in some cases enhance the z-axis conductivity as well). Thus, the type (e.g., shape) and amount of conductive particles may be selected as desired for a particular application. For example, conductive particles as disclosed herein may be used to provide conductive adhesives with relatively isotropic conductivity properties; or, to provide conductive adhesives with relatively anisotropic conductivity properties (e.g., so-called z-axis conductive adhesives).

In some embodiments, the ratio of the density of the electrically conductive particles to the density of an organic vehicle (e.g., a pressure sensitive adhesive precursor or the adhesive formed therefrom) may be below about 5. For example, the pressure sensitive adhesive resin density may range around from around 0.98 to about 1.1 grams per cubic centimeter, and electrically conductive particles with a low density base particle having a conductive coating may generally have a density below about 5 grams per cubic centimeter (g/cc). In contrast, known electrically conductive metal particles often have a density of at least about 7 g/cc.

The amount, size, etc. of electrically conductive particles can be chosen so as to provide the desired level of electrical conductivity. In some embodiments, these parameters may be chosen such that the electrically conductive particles merely provide local conductivity (e.g., of the particles themselves) without necessarily imparting longer range (e.g., x-y and/or z-axis) conductivity to an organic vehicle (e.g., an adhesive layer) within which the conductive particles are provided. In other embodiments, these parameters may be chosen such that the electrically conductive particles provide overall, longer range conductivity to an organic vehicle (e.g., conductivity through the z-axis thickness of an adhesive, and/or through the x-y plane of an adhesive). In some embodiments, the amount and/or arrangement of the conductive particles may be such that a pressure sensitive adhesive comprising the particles comprises a z-axis resistance of less than 4.0 ohms, as measured using procedures outlined in the Technical Data Sheet for 3MXYZ/Isotropic Electrically Conductive Adhesive Transfer Tape 9707. In various embodiments, the electrical resistance in the z-direction measured in this manner may be below 3, 2, 0.5, or 0.05 ohms. In some embodiments, the electrical resistance of an organic vehicle (e.g., a pressure sensitive adhesive), measured by methods disclosed herein, in the x-y plane of the adhesive (i.e., a direction perpendicular to the shortest dimension (the z-axis thickness dimension) of the adhesive, may be below 100 ohms. In various embodiments, the thus-measured electrical resistance in the in-plane x-y direction may be below 50, 20, 10, 5, or 1 ohms.

In some embodiments, the amount and arrangement of the conductive particles may be such that a pressure sensitive adhesive comprising the particles comprises a current carrying capacity of at least 1.0 amps per square inch (per 6.45 square centimeter), as measured using procedures outlined in the Technical Data Sheet for 3M XYZ/Isotropic Electrically Conductive Adhesive Transfer Tape 9707.

Generally an amount of conductive particles (in volume percent or vol. %) used in the adhesive ranges may be at least about 1, 2, 5, 10, 20 or even greater. In other embodiments, the amount of particles (vol. %) used in the adhesive may be below about 60, 30, 25, 20, or even below about 10. As mentioned, the conductive particles may be in the form of relatively spherical particles, or as flakes, fibers and the like. Combinations of conductive particles of various shapes and sizes may be used.

Conductive particles may comprise thermal conductivity that may impart enhanced thermal conductivity properties to an organic vehicle containing the conductive particles. In various embodiments, an organic vehicle (e.g., a pressure sensitive adhesive) comprising conductive particles may exhibit an apparent thermal conductivity (e.g., as measured in similar manner to the procedures of ASTM D5470) of at least 0.5, 1, 2, 4, or even 10 watts/meter-degree Kelvin.

Conductive particles that may be suitable for the uses disclosed herein may include e.g. the products available under the trade designation Conduct-O-Fil from Potters Industries (Valley Forge, Pa.), and the particles available from Novamet Specialty Products (Wycoff, N.J.) under the tradename Novamet. Other suitable conductive particles are described in U.S. Patent Application Ser. No. 60/820,174, entitled Electrically Conductive Pressure Sensitive Adhesives, incorporated by reference herein in its entirety for this purpose.

As used herein, the term "nanoparticles" signifies particles with an average primary particle size of less than 100 nanometers and in which the primary particles are not present in the form of agglomerates that cannot be straightforwardly de-agglomerated to provide primary particles of the above-listed size. "Average primary particle size" refers to the average diameter obtained from measurements of multiple individual (non-agglomerated) particles. Nanoparticle size measurements can be performed e.g. by transmission electron microscopy. In the case of nanoparticles that deviate from substantially spherical in shape, those of skill in the art will recognize the particle size to refer to an effective particle size (of a sphere of the same volume as the actual particle). In some embodiments, the nanoparticles have an average particle size of less than about 40 nanometers, about 20 nanometers, or about 10 nanometers. In further embodiments, the nanoparticles have an average primary or agglomerate particle size diameter of at least 1, 2 or 3 nanometers.

In this context, "nanoparticles" as defined herein will be distinguished from materials such as fumed silica, pyrogenic silica, precipitated silica, etc. Such silica materials are known to those of skill in the art as being comprised of primary particles that are essentially irreversibly bonded together in the form of aggregates which have an average size greater than 100 nm (e.g., typically of at least 200 nanometers) and from which it is not possible to straightforwardly extract individual primary particles.

In some embodiments, the nanoparticles used herein are inorganic nanoparticles. That is, although certain (e.g. crosslinked) organic materials may have sufficient hardness and durability to be used if desired, in some embodiments the nanoparticles comprise an inorganic material. Exemplary inorganic materials that may be available in nanoparticulate form include for example metal phosphates, sulfonates and carbonates (e.g., calcium carbonate, calcium phosphate, hydroxy-apatite); oxides, e.g. metal oxides (e.g., zirconia, titania, silica, ceria, alumina, iron oxide, vanadia, zinc oxide, antimony oxide, tin oxide, and alumina-silica), and metals (e.g., gold, silver, or other precious metals). Nanoparticles, e.g. silica nanoparticles, may be obtained from commercial sources, e.g. from Nalco Co, Napervillle, Ill. Nanoparticles can also be made using techniques known in the art. For example, zirconia nanoparticles can be prepared using hydrothermal technology, as described for example in PCT application US2008/087385.

In some embodiments, nanoparticles may be obtained in the form of a colloidal dispersion. For example, colloidal silica dispersions are available from Nalco Co. under the trade designations "NALCO 1040," "NALCO 1050," "NALCO 1060," "NALCO 2326", "NALCO 2327," and "NALCO 2329". Zirconia nanoparticle dispersions are available from Nalco Chemical Co. under the trade designation "NALCO OOSSOO8" and from Buhler AG Uzwil, Switzerland under the trade designation "Buhler zirconia Z-WO". Some colloidal dispersions can be dried to provide dry nanoparticles if desired for particular purposes.

The nanoparticles may be fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

By surface-modified is meant that the nanoparticles are modified so as to contain at least some organic groups on their surface. In general, a surface modification agent has at least a first end with at least one reactive group that can covalently bond to the nanoparticle surface, and a second, organic end that can modify the properties of the nanoparticle surface.

Examples of potentially useful surface modification (treatment) agents include alcohols, amines, carboxylic acids, sulfonic acids, phosphonic acids, silanes and titanates. The preferred type of modification agent may be determined, in part, by the chemical nature of the (e.g. metal oxide) nanoparticle surface. Silanes may be preferred for silica and for other siliceous fillers. Silanes and carboxylic acids may be preferred for metal oxides such as zirconia.

Suitable surface modification agents for some applications include silanes with a nonreactive organic end (substituent) that is generally nonpolar in nature. Such substituents may be hydrocarbons (e.g., alkyl, phenyl, and the like) or may be hydrocarbons with sufficiently small amounts of hetero atoms such that one of ordinary skill in the art would recognize the substituent as being nonpolar. Exemplary surface modification agents of this type include isooctyltrimethoxy silane (in which the hydrocarbon group is an isooctyl group and the methoxy groups are the reactive groups which may e.g. hydrolyze and react with e.g. the surface of a nanoparticle) and methyltrimethoxy silane. Such nonpolar substituents may be particularly useful in applications in which the surface-modified nanoparticles are included in an organic vehicle comprised mainly of generally nonpolar components (e.g.,. isooctylacrylate and the like). However, e.g. for inclusion in organic vehicles that contain a significant component of relatively polar materials (e.g., acrylic acid and the like), surface modification agents with relatively polar substituents may be used.

Exemplary silanes thus include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy) propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acryloxyalkyldialkylalkoxysilanes such as 3-(methacryloxy)propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltrit-butoxysilane, vinyltris(isobutoxy)silane, vinyltriisopropenoxysilane, and vinyltris(2-methoxyethoxy) silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl) methoxyethoxyethoxyethyl carbamate (PEG2TES), and SILQUEST A-1230; and combinations thereof.

In some embodiments, the surface modification agent may be multifunctional so as to contain multiple reactive groups by which the surface modification agent can covalently bond to the surface of the nanoparticle (and additionally to the surface of the conductive particle, as described in further detail herein). Thus, in some embodiments the same multifunctional agent or agents that may be used to provide the surface modification of the nanoparticle, may also be used to provide the covalent bonding of the surface-modified nanoparticles to the conductive particles. For example, isooctyltrimethoxy silane may be used for this dual purpose. In other embodiments, one agent (e.g., a monofunctional silane, such as trimethylmethoxy silane) may be used primarily to provide the surface modification, and a different, multifunctional agent, may be used to provide the covalent bonding between the conductive particles and the surface-modified nanoparticles.

In order to perform the surface modification, the nanoparticles may be combined with the surface modification agent, e.g. in a liquid that may act e.g. to disperse or suspend the nanoparticles and/or to disperse, suspend or dissolve the surface modification agent. The amount of surface modifier to be used may depend upon several factors such as nanoparticle size, nanoparticle type, molecular weight of the surface modifier, and modifier type. In general, it may be preferred that approximately a monolayer of modifier is attached to the surface of the nanoparticle. The attachment procedure or reaction conditions may also depend on the surface modifier used. For silanes it may be preferred to surface treat at elevated temperatures under acidic or basic conditions for about 1-24 hours.

The surface modification of nanoparticles e.g. in a colloidal dispersion can be accomplished in a variety of ways. The process may involves the mixing of an inorganic dispersion with one or more surface modifying agents. Optionally, a co-solvent can be added, such as for example, 1-methoxy-2-propanol, methanol, ethanol, isopropanol, ethylene glycol, N,N-dimethylacetamide, 1-methyl-2-pyrrolidinone, and mixtures thereof The co-solvent can enhance the solubility of the surface modifying agents as well as the dispersibility of the surface modified nanoparticles. The mixture comprising the colloidal dispersion and surface modifying agents may be subsequently reacted at room or an elevated temperature, with or without mixing.

Methods of surface-modifying nanoparticles are described in further detail e.g. in U.S. Pat. No. 6,586,483, and in U.S. Patent Application Ser. No. 61/220,698, entitled "Method of Milling Particles with Nanoparticles and Milled Free-flowing Powder", which are incorporated by reference in their entirety herein for this purpose.

The disclosed combination of conductive particles with surface-modified nanoparticles covalently bonded to the surface thereof may be achieved e.g. by carrying out the above-described covalent bonding of one or more surface-modifying agents with the nanoparticles, and then adding the conductive particles to the reaction mixture so as to allow or promote reaction of the surface-modifying agents with the conductive particles. Thus, as mentioned, a multifunctional surface-modifying agent may be covalently bonded to the surface of a nanoparticle via one or more of the reactive groups of the agent, while preserving at least one or more of the reactive groups of the agent in a state in which they are able to react with the surface of a conductive particle. Thus, for example, a surface modification agent such as isooctyltrimethoxysilane may be combined in a reaction mixture with e.g. a silica nanoparticle such that one or two of the methoxy groups of a molecule of the agent are hydrolyzed and covalently bonded to the surface of the silica nanoparticle. A conductive particle such as e.g. an at least partially silver-coated glass flake may then be added to the reaction mixture such that one or two remaining methoxy groups of the agent molecule are able to hydrolyze and covalently bond to the surface of the conductive particle (such bonding may be e.g. with a residual hydroxyl group of a portion of the surface of the glass flake that is not coated with silver, with a portion of an oxide layer present on the silver, etc.). Of course, many such bonds between many surface modification agent molecules and the nanoparticles and the conductive particles, will be present in actuality.

The amounts of surface modification agents relative to the amounts of nanoparticles and conductive particles, and the conditions and times under which the reaction mixture is allowed to react, may be controlled as desired in order to most advantageously achieve the covalent bonding between the surface-modified nanoparticles and the conductive particles.

Methods of surface-modifying nanoparticles and bonding nanoparticles to other particles are described in further detail e.g. in U.S. Patent Application Ser. No. 61/141,311, entitled "Composite Particles and Method of Forming", which is incorporated by reference in its entirety herein for this purpose.

Conductive particles comprising a plurality of surface-modified nanoparticles that are covalently bonded to the surface of the conductive particle as disclosed herein may be used to advantage in any organic vehicle (by which is generically meant any organic carrier, resin, material, matrix, syrup, varnish, paint, shellac, coating, adhesive, binder, etc.) in which it is desired to provide the conductive particles. In specific embodiments, the conductive particles with surface-modified nanoparticles covalently bonded thereto are dispersed into the vehicle.

The organic vehicle may be selected to provide an adhesive composition including, e.g., pressure sensitive, hot melt, thermoset and thermoplastic adhesive compositions. (Thus, the term organic vehicle is used broadly in this disclosure, to encompass e.g. organic syrups, and adhesives, including such adhesives as may be made from an adhesive precursor that is an organic syrup). The organic vehicle can include any adhesive composition including, e.g., solvent-coatable, hot-melt-coatable, radiation-curable (E-beam, actinic including, e.g., visible and UV, and thermal), water-based emulsion type adhesives and combinations thereof. Suitable pressure sensitive adhesive compositions include, e.g., tackified rubber adhesives, e.g., natural rubber, olefins, silicones, polyisoprenes, polybutadiene, polyurethanes, styrene-isoprene-styrene and styrene-butadiene-styrene block copolymers and other elastomers.

In some embodiments, the organic vehicle comprises a syrup (e.g., a liquid or liquid mixture comprising a viscosity e.g. of from 100 cps to 10000 cps, or from 200 cps to 5000 cps), which may be converted into a pressure-sensitive adhesive e.g. by the curing, reacting, polymerizing, etc., of monomers, oligomers, functionalized polymers, and the like, that are present in the syrup. Such syrups may include e.g. silicone materials which e.g. may be used to form silicone pressure sensitive adhesives as is well known. In particular embodiments, the syrup comprises acrylate-functional or methacrylate-functional (hereafter referred to collectively as "(meth) acrylate") monomers or oligomers. In this context, the term "monomer" when used herein will be understood to be used broadly to include oligomers and the like. Such monomers may be reacted to form the well-known family of (meth) acrylate pressure-sensitive adhesives. Useful (meth)acrylic acid esters include (meth)acrylic acid esters of a monohydric alcohol having from 1 to 20 carbon atoms including, e.g., isooctyl acrylate, 2-ethylhexyl acrylate, isononyl acrylate, isodecyl acrylate, decyl acrylate, dodecyl acrylate, lauryl acrylate, hexyl acrylate, butyl acrylate, and octadecyl acrylate and combinations thereof. Other useful monomers for (meth) acrylate-based adhesive compositions include ethylenically-unsaturated monomers including, e.g., cyclohexyl acrylate, isobornyl acrylate, N-octyl acrylamide, t-butyl acrylate, methyl methacrylate, ethyl methacrylate and propyl methacrylate and combinations thereof. Other useful ethylenically unsaturated monomers include, e.g., acrylic acid, methacrylic acid, itaconic acid, substituted acrylamides including, e.g., N,N-dimethylacrylamide, N-vinyl-2-pyrrolidone, N-vinyl caprolactam, acrylonitrile, tetrahydrofurfuryl acrylate, glycidyl acrylate, 2-phenoxyethyl acrylate and benzyl acrylate, and combinations thereof Where the organic vehicle includes monomers, oligomers and the like, polymerization can be achieved by various conventional free radical polymerization methods, which can be chemical or radiation initiated, including, e.g., solvent polymerization, emulsion polymerization, suspension polymerization, bulk polymerization and radiation polymerization including, e.g., processes using actinic radiation including, e.g., visible and ultraviolet light, electron beam radiation and combinations thereof.

The organic vehicle (whether in the form of an organic syrup or a pressure sensitive adhesive) may comprise tackifiers, crosslinkers, and the like, as are well known. The syrup may be partially pre-polymerized, e.g. before or after the addition of conductive particles, in order to increase the viscosity of the syrup e.g. as desired to improve the suspending of the conductive particles in the syrup, to improve the coating properties of the syrup, and the like.

Often, such (meth)acrylate pressure-sensitive adhesives are formed from a relatively large amount of a relatively nonpolar monomer and a relatively small amount of a relatively polar monomer. In particular embodiments, the syrup may comprise a radiation sensitized solventless (meth)acrylic pressure sensitive adhesive precursor comprising a (meth) acrylic acid ester of non-tertiary alcohol, the alkyl groups of which have an average of about 4 to 14 carbon atoms, and optionally a polar comonomer.

The relatively nonpolar (meth)acrylic acid ester non-tertiary alcohol used in the (meth)acrylic pressure sensitive adhesive precursor may comprise from about 100 to about 50 parts by weight of the precursor. In some embodiments, this ester may comprise below about 98 parts by weight of the precursor. In some embodiments this ester may comprise below about 80 parts by weight of the precursor. Suitable nonpolar monomers include, for example, isooctyl acrylate, 2-ethylhexyl acrylate, butyl acrylate, n-hexyl acrylate, and stearyl acrylate. Suitable optional polar comonomers include, for example, acrylic acid, methacrylic acid, itaconic acid, certain substituted acrylamides such as N,N dimethylacrylamide, N-vinyl-2-pyrrolidone, N-vinyl caprolactam, tetrahydrofurfuryl acrylate, benzylacrylate, 2-phenoxyethylacrylate, and combinations thereof. The optional polar comonomer may, if present, comprise from about 0.5 to about 50 parts by weight of the (meth)acrylic pressure sensitive adhesive precursor. In some embodiments, the polar monomer comprises at least about two parts by weight of the precursor. In other embodiments, the polar monomer comprises at least about five parts by weight of the precursor.

The monomers, oligomers, etc. and the proportions thereof are selected to provide a normally tacky and pressure-sensitive adhesive copolymer, e.g., that meets the well-known Dahlquist criterion. In some embodiments, such a mixture may contain from about 50 to 98 parts by weight of the nonpolar monomer and 2 to 50 parts of the polar monomer copolymerizable therewith, the sum of these being 100 parts by weight. Of course, more than one nonpolar monomer and/or more than one polar monomer can be used in a mixture when desired. The solventless (meth)acrylic pressure sensitive adhesive precursor may also comprise multifunctional (meth)acrylate monomers, e.g. at an amount of from about 0.05 to about 1 parts by weight of the precursor. The solventless (meth)acrylic PSA precursor may be sensitized by the addition of any known initiator, for example, thermal and photoinitiators.

Further details of the composition and formation of radiation sensitized solventless (meth)acrylic pressure sensitive adhesive precursors comprising a (meth)acrylic acid ester of non-tertiary alcohol, the alkyl groups of which have an average of about 4 to 14 carbon atoms, and a polar comonomer, are found in U.S. Patent Application Ser. No. 60/820,174, entitled Electrically Conductive Pressure Sensitive Adhesives, incorporated by reference herein in its entirety for this purpose.

Pressure-sensitive adhesives may be formed e.g. by the deposition of a suitable organic vehicle onto a substrate and the solidification (e.g., curing, reacting, etc.) of the vehicle to achieve pressure-sensitive adhesive properties. Such pressure-sensitive adhesives may be deposited onto (e.g., between) one or more release liners e.g. so as to form a transfer tape, may be deposited onto a substrate with a relatively permanent bond therebetween, and so on, as is well known to those of skill in the art. The thus-formed pressure-sensitive adhesive layers may be advantageously used e.g. as electrically conductive adhesives and the like. Properties and uses of some conductive adhesives, e.g. isotropic conductive adhesives, are described in U.S. Patent Application Ser. No. 60/820,174, entitled Electrically Conductive Pressure Sensitive Adhesives, incorporated by reference herein in its entirety for this purpose. As mentioned, in some cases such adhesives may provide enhanced thermal conductivity as well.

It has been found that the use of conductive particles that comprise surface-modified nanoparticles that are covalently bonded to the surface of the conductive particle as disclosed herein, can advantageously enhance the processing of organic syrups (e.g. that are used to form pressure-sensitive adhesives). Specifically, those of skill in the art will appreciate that the dispersion of conductive particles, particularly conductive particles with relatively high aspect ratio, such as flakes, fibers and the like, into adhesive precursor syrups, may be difficult. Specifically, the blending of such conductive particles into adhesive precursor syrups may cause the adhesive precursor syrup to gel (e.g., to become a viscoelastic mass that is difficult to mix further, to pump, to coat into a uniform layer, and the like). It has been found that when such conductive particles are present, the presence of surface-modified nanoparticles as disclosed herein can significantly and advantageously reduce the likelihood and/or degree of such gelling.

It has also been found that surface-modified nanoparticles that are covalently bonded to the conductive particles may be more effective in performing this function than are surface-modified nanoparticles that are not covalently bonded to the conductive particles (e.g., that are dry blended with the conductive particles), as demonstrated herein in Table 1 of the Examples section. It has further been found that, surprisingly, the presence of surface-modified nanoparticles on the surface of, and covalently bound to, conductive particles, does not appear to detract from the conductive properties that can be imparted to an adhesive by the conductive particles. Specifically, pressure-sensitive adhesives formulated with conductive particles with surface-modified nanoparticles covalently bonded thereto, have been found to exhibit satisfactory x-y electrical conductivity (that is, in the plane of the adhesive layer), as demonstrated in Table 2. In sharp contrast, the direct attachment of such surface modification agents to the surface of the conductive particles (while it may allow the conductive particles to be more easily dispersed into an adhesive precursor syrup, as seen in Table 1) has been found to drastically reduce the x-y conductivity of a pressure-sensitive adhesive containing the conductive particles, as demonstrated in Table 2. Thus, the methods disclosed herein may allow conductive particles to be more easily dispersed into an adhesive precursor syrup, by way of surface modification agents present on the surface of nanoparticles covalently bonded to the conductive particles (rather than by way of surface modification agents that are present directly on the surface of the conductive particles), in a way that does not disadvantageously affect the ability of the conductive particles to provide conductivity as desired for particular applications.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

EXAMPLES

All parts, percentages, and ratios in the examples and the rest of the specification are based on weight, unless noted otherwise. Solvents and other reagents used were obtained from Sigma-Aldrich Chemical Company (Milwaukee, Wis.) unless otherwise noted.

Silica nanoparticles (16.6% solids dispersed in water) were obtained from Nalco Company, Naperville, Ill. under the trade designation NALCO 2326. These nanoparticles were reported by the supplier as having an average particle size of approximately 5 nm.

Conductive particles were obtained from Potters Industries, Valley Forge, Pa., under the trade designation Conduct-o-Fil SG15F35. These conductive particles are reported by the supplier to be silver-coated glass flakes, with a weight % silver of 35%, and with an average diameter of 15 microns and an average thickness of 2 microns. This product thus comprised an average aspect ratio, based on the dimensions reported by the supplier, of approximately 7.5.

Conductive particles were obtained from Novamet Specialty Products, Wycoff, N.J., under the trade designation Novamet. These conductive particles are reported by the supplier to be silver coated nickel spheres. This product thus comprised an average aspect ratio of approximately 1.0.

Preparation of Silver-Coated Glass Flakes with Covalently Bound Surface-Modified Nanoparticles NALCO 2326 silica nanoparticles were surface-modified with a mixture of isooctyltrimethoxy silane and methyltrimethoxy silane, in similar manner as described in U.S. Patent Application Ser. No. 61/220,698, entitled "Method of Milling Particles with Nanoparticles and Milled Free-flowing Powder. An oil bath was set to 80° C. and allowed to reach temperature while the reaction was being prepared. 6.5 g Nalco 2326 dispersion in water was measured into a 3-neck round-bottom flask equipped with a mechanical stirrer and a condenser. The flask was lowered into the oil bath and the contents were stirred at a medium-high rate. 400 g of ethanol (EMD, Gibbstown, N.J.) and 100 g of methanol were combined in a 600 mL beaker. Approximately one-third of the solvent mixture was added to the 3-neck round-bottom flask. 50 g of the solvent mixture was measured into a 150 mL beaker to which 0.41 g of isooctyltrimethoxy silane (Gelest, Morrisville, Pa.) and 0.05 g of methyltrimethoxy silane were added. This solution was mixed thoroughly and added to the 3-neck round bottom flask. The beaker was rinsed with 50 g of solvent mixture two times and the rinses were added to the 3-neck round-bottom flask. The reaction mixture was allowed to stir for an hour. 200 g of silver-coated glass flakes were then added to the flask while stirring and the remaining solvent was used to wash the silver-coated glass flake reside into the reaction mixture. The reaction mixture was stirred for an additional 3.5 hours. The modified silver flakes were transferred to an aluminum pan and dried down at 120° C. until dry. These materials were used in the preparation of samples SMN1, SMN2, SMN3, and SMN4, as described below.

Preparation of Silver-Coated Glass Flakes Comprising Surface Modification

An oil bath was set to 80° C. and allowed to reach temperature while the reaction was being prepared. Silver-coated glass flakes was measured into a 3-neck round-bottom flask. 200 g of ethanol with 50 g of methanol were combined in a 500 mL beaker. Approximately, one-third of solvent was added to the 3-neck round bottom flask equipped with a mechanical stirrer and a condenser, to thorough wet out the silver flakes. The flask was lowered into the oil bath and the contents were stirred at a medium-high rate. 50 g of the solvent mixture was placed in a 100 mL beaker and isooctyltrimethoxy silane, and methyltrimethoxy silane were added. The solution was mixed and added to the contents in the reaction flask. The beaker was rinsed with the remaining solvent and the reaction was stirred for at least 4 hours. The modified silver flakes were transferred to an aluminum pan and dried down at 120° C. until dry. These materials were used in the preparation of samples SMF1, SMF2, and SMF3, as described below.

Preparation of Silver-Coated Glass Flakes Dry-Blended with Surface-Modified Nanoparticles NALCO 2326 silica nanoparticles were surface-modified with a mixture of isooctyltrimethoxy silane and methyltrimethoxy silane, in similar manner as described in U.S. Patent Application Ser. No. 61/220,698, entitled "Method of Milling Particles with Nanoparticles and Milled Free-flowing Powder. The surface-modification was performed in similar manner as described above except that silver-coated glass flake was not added to the reaction mixture as done in the above procedure. Instead, the surface-modified nanoparticles were dried and were then dry blended with the silver coated glass flake at a weight ratio of nanoparticles of approximately 0.5 weight %. These materials were used in the preparation of samples DB1 and DB2 as described below.

Preparation of Pressure Sensitive Adhesive Precursor Syrup

A mixture of 87.5 parts of isooctyl acrylate, 12.5 parts of acrylic acid and 0.04 parts of photoinitiator (Ciba® Irgacure® 651), was partially photopolymerized using fluorescent black light lamps to a syrup having a viscosity of approximately 2200 centipoises (2.2 N*s/m$^2$). An additional 0.19 parts Ciba® Irgacure® 651, and 0.065 parts hexanediol diacrylate crosslinker were added and mixed into the syrup (Syrup 1).

A mixture of 93.5 parts of isooctyl acrylate, 6.5 parts of acrylic acid and 0.04 parts of Ciba® Irgacure® 184 was partially photopolymerized using fluorescent black light lamps to a syrup having a viscosity of approximately 2000 centipoises (2 N*s/m$^2$). An additional 0.35 parts Ciba® Irgacure® 184, 0.15 parts XL-330 triazine crosslinker and 10 parts Foral 85 tackifier were added and mixed into the syrup (Syrup 2).

Blending of Silver-Coated Glass Flakes with Pressure Sensitive Adhesive Precursor Syrup 90 parts Syrup 1 and 10 parts Syrup 2 were blended to form a blended syrup. The blended syrup was placed into a 400mL plastic measuring cup. A glass stir rod with a Teflon fan-like paddle was lowered into the syrup until the paddle was completely immersed, and then the overhead stirrer was turned on to a medium-high speed. Silver flake was added incrementally, allowing each increment to fully incorporate into the syrup prior to subsequent additions. During the additions, the onset of gelling, if it occurred, was noted. Addition of silver flake continued until a total amount of flake was incorporated to provide a loading of flake of approximately 42 weight % (of the total weight of the syrup including the flake). The syrup was allowed to mix for 3-5 more minutes after all of the flake was added. A tongue depressor was used to scrape down the gel during stirring. The experiment was performed with various silver flakes: unmodified flake (Control); surface-modified flake (SMF); flake dry blended with surface-modified nanoparticles (DB); and flake with covalently bonded surface modified nanoparticles (SMN). Multiple samples were run of certain formulations as shown in Table 1. The weight percentage of flake (as a percentage of the total weight of the syrup including the flake) that caused gelling was recorded and is shown in Table 1.

TABLE 1

Effect of Conductive Particles on Gelling of Syrup

| Sample | Conductive Particles | Flake Added to Cause Gelling (Weight %) |
|---|---|---|
| Control | Silver-coated glass flake, no nanoparticles or surface modification | 13.80 |
| DB1 | Silver-coated glass flake dry blended with surface-modified nanoparticles | 16.14 |
| DB2 | Silver-coated glass flake dry blended with surface-modified nanoparticles | 19.72 |
| SMN1 | Silver-coated glass flake with covalently bound surface-modified nanoparticles | No Gelling |
| SMN2 | Silver-coated glass flake with covalently bound surface-modified nanoparticles | No Gelling |
| SMN3 | Silver-coated glass flake with covalently bound surface-modified nanoparticles | No Gelling |
| SMF1 | Surface-modified silver-coated glass flake | No Gelling |
| SMF2 | Surface-modified silver-coated glass flake | No Gelling |

Coating of Adhesives Containing Silver-Coated Glass Flakes

Syrups 1 and 2 were produced as described above. 180 g of Syrup 1 and 20 g of Syrup 2 were blended with 144.8 g of silver-coated glass flake with covalently bound surface-modified nanoparticles (Sample SMN4) and 107.3 g Novamet Silver Coated Nickel Spheres (not surface modified and not comprising covalently bound nanoparticles). The mixture was degassed under reduced pressure and immediately coated between two silicone treated transparent plastic films to a thickness of approximately 51 μm. The coating was irradiated in an inert atmosphere, with fluorescent black light lamps such that the energy received at the surface of the adhesive coating was approximately 540 milliJoules (mJ)/cm². The irradiation energy received at the adhesive coating surface was calibrated using a Light Mapper UVI Map available from Electronic Instrumentation and Technology, Inc., Sterling, Va.

A similar adhesive was produced except that surface-modified silver-coated glass flake (SMF3) was used instead of silver-coated glass flake with covalently bound surface-modified nanoparticles.

A similar adhesive was produced except that as-received, unmodified silver glass flake (Control) was used instead of silver-coated glass flake with covalently bound surface-modified nanoparticles.

Conductivity Measurements on Coated Adhesives

The x-y plane resistance of the adhesives were measured by the following procedure. An IPC Multi-Purpose test board (IPC-B-25A) was obtained from Diversified Systems, Inc., Indianapolis, Ind. An adhesive sample was laminated to 2.0 mil (51 μm) thick polyester film. A test strip sample 5 mm wide and approximately 25 mm long was cut from the laminate. The test strip was laminated to the IPC-B-25A test board so as to traverse multiple pairs of electrically conductive traces (each trace was 2.0 mm wide with a space of 2.0 mm between adjacent traces of a trace pair). Lamination was done with a 4.5 lb rubber covered roller. The test assembly was allowed to remain at 23° C. for one hour. The electrical resistance (through a 2.0 mm length of the adhesive sample spanning adjacent traces of a trace pair) was measured with a Keithley 200-20 Multimeter, set in AutoRange mode. Typically, resistance was measured for several (e.g., six) trace pairs, corresponding to several different locations of the adhesive strip sample. Typically, several strip samples were tested in this manner.

The resulting average x-y plane resistance for the adhesive containing silver-coated glass flake with covalently bound surface-modified nanoparticles is reported in Table 2 (labeled Sample SMN4).

The average x-y plane resistance of the adhesive containing surface-modified silver-coated glass flake was likewise measured and is reported in Table 2 (labeled SMF3).

The average x-y plane resistance of the adhesive containing as-received, unmodified silver glass flake was likewise measured and is reported in Table 2 (labeled Control).

TABLE 2

Effect of Conductive Particles on Conductivity of Adhesive

| Sample | X-Y Plane Resistance (Ohms) |
|---|---|
| SMN4 | 11.3 |
| SMF3 | Open* |
| Control | 2.8 |

*"Open circuit" reading obtained, believed to correspond to a resistance at least in the Megohm range.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

What is claimed is:

1. A composition comprising:
a plurality of conductive particles that are metal-coated glass flakes comprising an aspect ratio of at least about 2:1;
wherein each conductive particle has a plurality of surface-modified nanoparticles covalently bonded to the surface of the conductive particle,
wherein the surface of each surface-modified nanoparticle comprises nonpolar hydrocarbon organic substituents derived from a surface modification agent,
and wherein each nanoparticle that is surface-modified is not conductive.

2. The composition of claim 1 wherein the conductive particles are nonspherical particles comprising an aspect ratio of at least about 2:1.

3. The composition of claim 1 wherein the conductive particles are nonspherical particles comprising an aspect ratio of at least about 7:1.

4. The composition of claim 1 wherein the conductive particles comprise a nonconductive core and comprise at least a layer of a material having an electrical conductivity of at least about $1 \times 10^7$ siemens per meter.

5. The composition of claim 4 wherein the conductive particles have a density greater than zero and below about five grams per cubic centimeter.

6. The composition of claim 1 wherein the surface-modified nanoparticles are covalently bonded to the conductive particle by the same multifunctional surface-modifying agent that is used to provide the surface modification of the nanoparticles.

7. The composition of claim 1 wherein the weight ratio of surface-modified nanoparticles to conductive particles is from about 0.25% to about 1.0%.

8. A composition comprising:
an organic vehicle comprising a plurality of conductive particles dispersed therin,
wherein the conductive particles are metal-coated glass flakes comprising an aspect ratio of at least about 2:1;
wherein each conductive particle has a plurality of surface-modified nanoparticles covalently bonded to the surface of the conductive particle,
wherein the surface of each surface-modified nanoparticle comprises nonpolar hydrocarbon organic substituents derived from a surface modification agent,
and wherein each nanoparticle that is surface-modified is not conductive.

9. The composition of claim 8 wherein the organic vehicle comprises an organic syrup comprising a viscosity of between 100 cps and 10000 cps.

10. The composition of claim 8 wherein the organic vehicle is a pressure-sensitive adhesive.

11. The composition of claim 10 wherein the organic vehicle is a (meth)acrylate pressure-sensitive adhesive.

12. The composition of claim 11 wherein the organic vehicle is the reaction product of a pressure sensitive adhesive precursor syrup comprising a (meth)acrylic acid ester of a non-tertiary alcohol, the alkyl groups of which have an average of about 4 to 14 carbon atoms, and a polar comonomer.

13. The composition of claim 10 wherein the pressure-sensitive adhesive is an electrically conductive adhesive layer comprising an x-y plane resistance of less than 20 ohms.

14. The composition of claim 13 wherein the conductive particles are metal-coated glass flakes comprising an aspect ratio of at least about 2:1 and comprising a density greater than zero and below about five grams per cubic centimeter.

15. The composition of claim 10 wherein the pressure-sensitive adhesive comprises an apparent thermal conductivity of at least 1 watt/meter-degree Kelvin.

16. A method of making a composition comprising a plurality of conductive particles with surface-modified nanoparticles covalently bonded thereto, comprising:
 providing a plurality of non-conductive nanoparticles in a liquid;
 reacting at least some of the non-conductive nanoparticles with multifunctional surface-modifying agent molecules so that at least a portion of the surface of each non-conductive nanoparticle comprises multifunctional surface-modifying agent molecules covalently bonded to the nanoparticle so as to provide a surface-modified nanoparticle that is not conductive;
 adding a plurality of conductive particles to the liquid, wherein the conductive particles are metal-coated glass flakes comprising an aspect ratio of at lest about 2:1; and,
 reacting at least some of the conductive particles with at least some of the multifunctional surface-modifying agent molecules that are covalently bonded to the surface of the nanoparticles, so that each conductive particle thus reacted comprises a plurality of surface-modified nanoparticles attached thereto by way of the multifunctional surface-modifying agent,
 and wherein the surface of each non-conductive suface-modified nanoparticle comprises nonpolar hydrocarbon organic substituents derived from a surface modification agent.

17. The method of claim 16, further comprising the step of mixing the composition comprising a plurality of conductive particles with surface-modified nanoparticles covalently bonded thereto, with an organic syrup.

18. The method of claim 17, wherein the organic syrup is a pressure-sensitive adhesive precursor composition.

19. The method of claim 18, further comprising the steps of depositing the pressure-sensitive adhesive precursor to form a layer and curing the pressure-sensitive adhesive precursor composition to form a pressure-sensitive adhesive.

20. The method of claim 19, wherein the pressure-sensitive adhesive comprises a (meth)acrylate pressure-sensitive adhesive that comprises an x-y plane resistance of less than 20 ohms, and wherein the conductive particles comprise a density greater than zero and below about five grams per cubic centimeter.

* * * * *

UNITED STATES PATENT AND TRADEMARK OFFICE
CERTIFICATE OF CORRECTION

| | | |
|---|---|---|
| PATENT NO. | : 9,153,354 B2 | Page 1 of 2 |
| APPLICATION NO. | : 13/504651 | |
| DATED | : October 6, 2015 | |
| INVENTOR(S) | : Jimmie Baran et al. | |

It is certified that error appears in the above-identified patent and that said Letters Patent is hereby corrected as shown below:

In the specification

Column 1
Line 12-13, Delete "No.61/262934," and insert -- No. 61/262,934, --, therefor.

Column 3
Line 31, Delete "3MXYZ/Isotropic" and insert -- 3M XYZ/Isotropic --, therefor.

Column 4
Line 3, Delete "(Wycoff," and insert -- (Wyckoff, --, therefor.

Column 4
Line 48, Delete "Napervillle," and insert -- Naperville, --, therefor.

Column 5
Line 53-54, Delete "acyrloxyalkyldialkylalkoxysilanes" and insert
-- acryloxyalkyldialkylalkoxysilanes --, therefor.

Column 8
Line 20, Delete "thereof" and insert -- thereof. --, therefor.

Column 10
Line 60, Delete "Wycoff," and insert -- Wyckoff, --, therefor.

In the claims

Column 14
Line 39, In Claim 8, delete "therin," and insert -- therein, --, therefor.

Signed and Sealed this
Fourteenth Day of June, 2016

Michelle K. Lee
*Director of the United States Patent and Trademark Office*

Column 14
Line 51-52, In Claim 9, delete "vehicle comprises" and insert -- vehicle is --, therefor.

Column 15
Line 4, In Claim 15, delete "adhesive comprises" and insert -- adhesive exhibits --, therefor.

Column 15
Line 20, In Claim 16, delete "lest" and insert -- least --, therefor.

Column 16
Line 4, In Claim 16, delete "suface-" and insert -- surface- --, therefor.